United States Patent [19]

Perego

[11] Patent Number: 5,356,092
[45] Date of Patent: Oct. 18, 1994

[54] REDUCED SIZE TAPE LOADING MODULE
[75] Inventor: Luciano Perego, Milan, Italy
[73] Assignee: Tapematic U.S.A., Inc., Orlando, Fla.
[21] Appl. No.: 955,462
[22] Filed: Oct. 2, 1992

Related U.S. Application Data

[63] Continuation-in-part of Ser. No. 905,740, Jun. 29, 1992.

[51] Int. Cl.⁵ .............................................. B65H 21/00
[52] U.S. Cl. ...................... 242/523; 156/502
[58] Field of Search .................. 242/56 R, 58.1, 58.4; 156/502, 505

[56] References Cited

U.S. PATENT DOCUMENTS

| | | | |
|---|---|---|---|
| 3,643,889 | 2/1972 | Krause | 242/182 |
| 3,848,825 | 11/1974 | Zielke | 242/56 R |
| 4,091,426 | 5/1978 | Umeda | 242/57 |
| 4,512,527 | 4/1985 | Rehklau et al. | 242/56 R |
| 4,543,152 | 9/1985 | Nozaka | 156/502 |
| 4,657,198 | 4/1987 | Shimizu et al. | 242/57 |
| 4,721,263 | 1/1988 | Miyazaki | 242/55 |
| 4,913,366 | 4/1990 | Andou | 242/57 |
| 4,979,690 | 12/1990 | Kita | 242/56 R |
| 5,125,588 | 6/1992 | Perego | 242/56 R |
| 5,152,470 | 10/1992 | Farrow et al. | 242/56 R |

FOREIGN PATENT DOCUMENTS 0281884 9/1988 European Pat. Off. .
2353112 12/1977 France .

*Primary Examiner*—Daniel P. Stodola
*Assistant Examiner*—John Q. Nguyen
*Attorney, Agent, or Firm*—Edgar H. Haug; Adam L. Brookman

[57] ABSTRACT

An apparatus comprising a tape loading module for loading use tape into cassettes which includes a chassis having a front face plate upon which a miniature vacuum chamber and counter wheel combination, a leader extractor pin, two movable tape support blocks and a leader positioning assembly are mounted. The juxtaposition of these particular components, their particular configurations and their modes of operation permit the construction of a tape loading module which is significantly reduced in size from previous loading modules.

9 Claims, 3 Drawing Sheets

REDUCED SIZE TAPE LOADING MODULE

The present application is a continuation-in-part of U.S. application Ser. No. 07/905,740 entitled Multiple Module Tape Loading Apparatus and Method filed Jun. 29, 1992.

FIELD OF THE INVENTION

The present invention relates generally to automatic tape loading devices and methods and more specifically to a reduced size tape loading module for use in single or multiple module tape loading machines.

BACKGROUND OF THE INVENTION

The loading of tape cassettes, such as audio and/or video cassettes, is typically carried out by automatic machines in which individual cassettes are automatically fed from a supply magazine to a loading station. In the loading station, the cassettes are filled with a predetermined amount of use tape from a reel of magnetic tape ("pancake") which is detachably mounted on a support hub. (See e.g. U.S. Pat. Nos. 3,997,123, and 4,836,464). The loaded cassettes are then discharged from the loading station to a collection point.

Previously, loading machines were provided with a single loading station which was interlocked or cooperated with a magazine or other mechanism for supplying cassettes to be loaded. At least in part because of the size of the loading station and its attendant components, if a level of productivity requiring four loading stations were desired, it was necessary to set up four discrete loading machines. This involved not only a relatively high purchase cost but also required considerable space in a loading factory.

SUMMARY OF THE INVENTION

An object of the present invention is to provide a reduced size tape loading module for use with multiple module tape loading machines for loading use tape into cassettes.

It is a further object of the present invention to achieve increased productivity with a tape loading module for use with any tape loading machine while reducing bulkiness and increasing efficiency.

The objects of the present invention are achieved by a tape loading module for loading use tape into cassettes which includes a chassis having a front face plate upon which a miniature vacuum chamber and counter wheel combination, a leader extractor pin, two movable tape support blocks and a leader positioning assembly are mounted. The juxtaposition of these particular components, their particular configurations and their modes of operation permit the construction of a tape loading module which is significantly reduced in size from previous loading modules.

DETAILED DESCRIPTION

Figure 1:
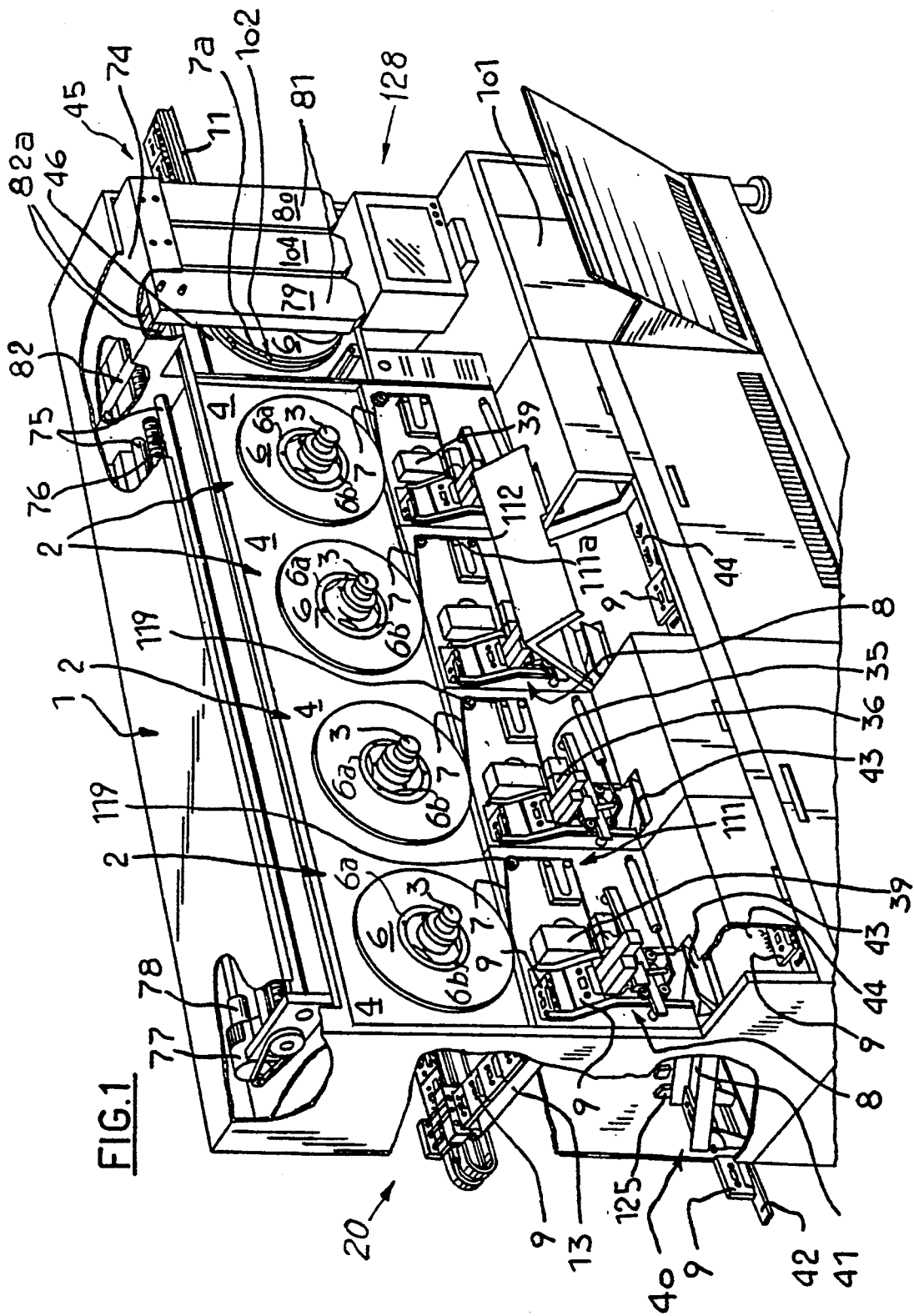
FIG. 1 is a perspective view of a multiple module tape loading machine incorporating the apparatus of the present invention.

Referring to FIG. 1, a cassette loading machine incorporating the present invention is generally designated with reference numeral 1.

The loading machine comprises a plurality of the removable loading modules 2 of the present invention disposed consecutively in side-by-side relation. Each module is associated with at least one support hub 3 mounted on a front wall portion 4 of the loading machine 1 and capable of rotation. Each support hub 3 removably engages pancakes 6 on which the use tape 7 is wound. From the pancake, the tape follows a predetermined path between different components of the respective loading module 2 to reach a splicing assembly 120. Thereafter the use tape is spliced to the leader tape from each cassette 9 and wound into the cassette. The cassettes are fed, one at a time, via an in-feed conveyor 13, to a loading station 8 adjacent the splicing assembly 120. The in-feed conveyor 13, may be replaced by an inclined delivery chute (not shown) if less precise transportation of cassette is permissible.

The in-feed conveyors 13, each extending from the supply conveyor 11 to the vicinity of one of the loading stations 8, comprise a further portion of the supply means 20. While only one in-feed conveyor 13 is shown in FIG. 1, an identical conveyor 13 is associated with each loading module 2.

Preferably associated with each in-feed conveyor 13 is a pusher element 14 capable of operatively engaging one of the cassettes 9 carried by the supply conveyor 11 to transfer a cassette to the in-feed conveyor 13. (If the cassettes are transported on the supply conveyor in a vertical orientation, a blower or other transfer means may be substituted for the pusher element 14. If, alternatively, the cassettes are transported on a plurality of spaced apart belts, a pick-up arm as shown and described in U.S. Pat. No. 5,118,045 may be employed.)

The in-feed conveyor 13 urges the cassettes 9 against a pair of front shoulders awe of feed guideways 16 (see FIG. 2) associated with the tape loading module 2. A rotating extractor pick 200 is preferably mounted on one of the guideways 16. The extractor pick 200 comprises an arm 202 operatively connected to a pneumatically operated rotary switch 204. A long pin 206 is slidably mounted in the arm 202 toward the arm's distal end. As the extractor pick 200 is rotated through an arc, it passes slightly between the bottom flanges of the front-most cassette 9 on the in-feed conveyor 13 to engage the leader tape 27 and extract it from the cassette housing in the form of a loop 27b.

Figure 2:
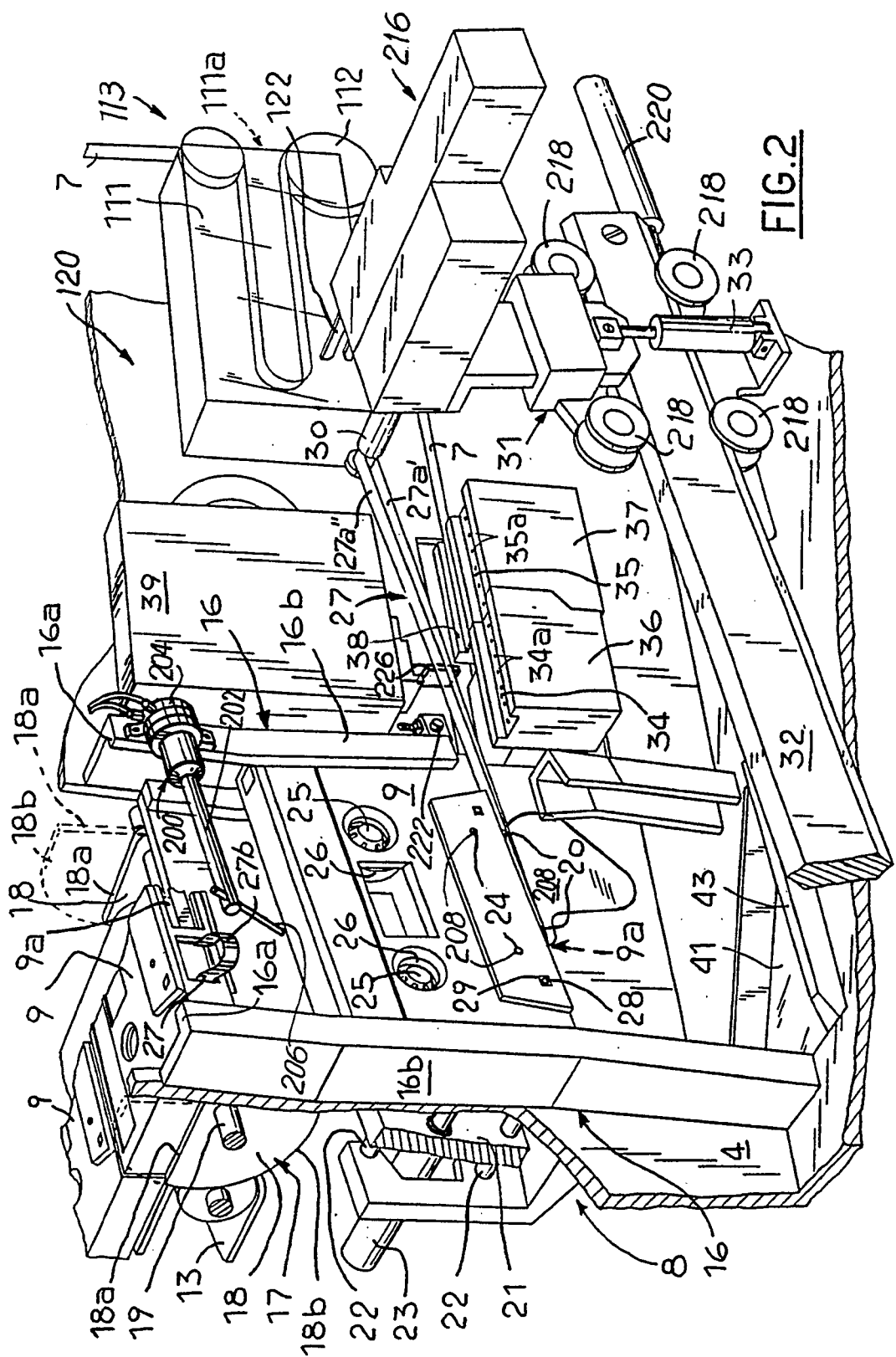
FIG. 2 is a front plan view of the tape loading module of the present invention.

A rotating member 17 acts between each in-feed conveyor 13 and the feed guides 16 to transfer the individual cassettes 9 from the conveyor to the loading station 8. As shown in FIG. 2, the rotating member 17 essentially comprises a pair of elements in the form of sectors of a circle 18 fastened to a drive shaft 19. The member 17 is rotated about the horizontal axis of the drive shaft 19 from a first position in which its rectilinear edges 18a are in coplanar alignment with the in-feed conveyor 13, to an operating position in which, by rotation through approximately 90°, the rectilinear edges are disposed substantially in alignment with the guideways 16 to drop the cassette 9 down along the guideways 16.

The sector-shaped elements 18 also have curved edges 18b adapted to offer, in the operating position, an abutment seat for the subsequent cassette 9 to prevent interference with the cassette being rotated into alignment with the guideways 16.

Figure 3:
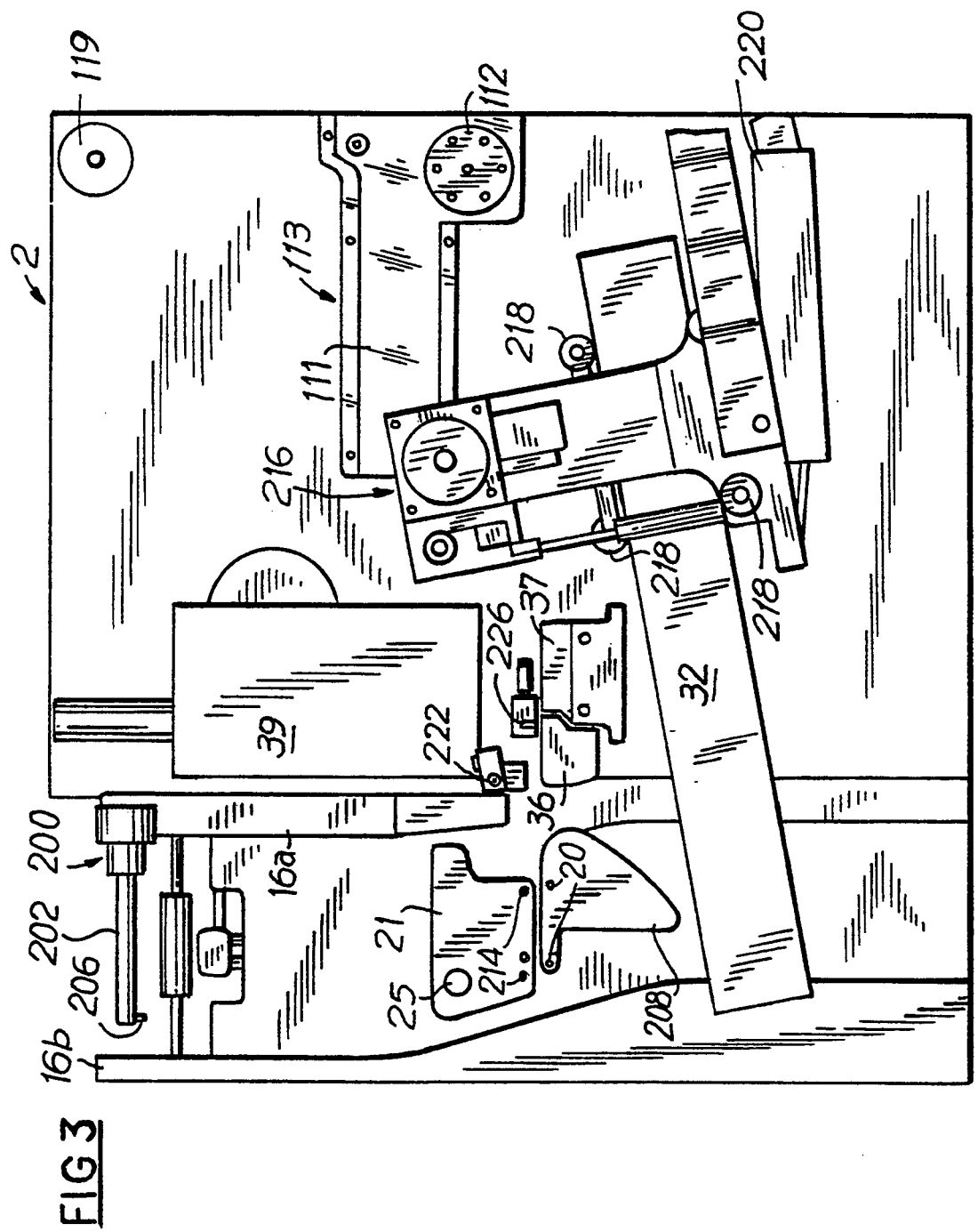
FIG. 3 is a perspective view of a loading station associated with the tape loading module of the present invention showing the leader extracted from a cassette, before the cassette loading operation begins.

The cassettes 9, when aligned within the guideways 16, fall down until they meet a pair of stop pegs 20 (shown in FIGS. 2 and 3). The stop pegs 20 are mounted on a first movable plate 208 which moves between a first position substantially flush with the front wall 4 and a second position behind the front wall 4. The plate 208 is slidably mounted on a guide member and is moved between its two positions by a fluid operated actuator.

When a cassette 9 is at rest and supported in the loading station 8 by the stop pegs 20, it is more precisely positioned by a pair of centering pins 214, which fit into holes 24 in the cassette housing and are connected to a second movable plate 21. The plate 21, which is slidably mounted on guide members 22 which are secured to the rear of the front wall 4, is moved close to and away from the front wall 4 upon command of one or more fluid-operated actuators 23. This brings the plate 21 from a first rest position to a second operating position in which the centering pins 214 fit into the locator holes 24.

The movable plate 21 also carries one winding spindle 25 which engages the left hub 26 in the cassettes 9. (In FIG. 2, for illustrative purposes only, plate 21 is shown in its first, rest position, while the pins 214 are shown as if the plate 21 was in its second, operating position.)

As discussed previously, a short portion of the leader 27 is extracted from the opening 9a of the cassette 9 by the action of the extractor pick 200 in the form of a loop 27b. When the cassette 9 is settled in the loading station 8, the leader loop is entered transversely by a bidirectionally movable pin 30 which is part of a positioning-/windoff assembly 216. The positioning/windoff assembly 216 is mounted on a transport 31 which moves along a slide 32 on a plurality of opposed wheels 218. The transport 31 is shifted sideways relative to the cassette 9 by an actuator 220. This causes an additional length of leader 27a to be pulled from the cassette 9. Once the leader has been pulled out sufficiently (i.e. past the splicing blocks 36 and 37), the positioning/windoff assembly 216 is lowered by a fluid-operated actuator 33, such that the pin 30 pulls the leader down below the surface of the blocks 36 and 37. This positively positions the leader 27a into aligned tracks 34 and 35 on first and second splicing blocks 36 and 37. The leader portion 27a is then held in the tracks 34 and 35 by suction produced through the holes 34a and 35a in the track bottoms. The positioning/windoff assembly 216 is returned to its original, raised position by actuator 33 thereby physically separating the top and bottom leader portions 27a' and 27a'' and bringing the top portion of the leader 27a'' into contact with a leader holder 222. The leader holder 222 holds the top portion of the leader 27a'' in a groove (not shown) by suction applied through holes (not shown). The pin 30 then retracts and the transport 31 returns to its starting position, in front of the loading station 8.

The splicing blocks 36 and 37 both shift inwardly to a new plane to bring them into alignment with the splicer mechanism 39 and adjacent to the cutter 226. The leader 27 is cut into two pieces by the cutter 226 as the cutter moves transversely between the blocks 36 and 37.

At this point, block 37 is shifted relative to block 36, in order to bring track 38 (holding the leading end of the use tape 7 coming from the pancake 6) into alignment with track 34. The splicer 39 is then operated to place a length of splicing tape from reel 162 on the leading edge of use tape 7 and the leading edge of leader portion 27a in track 34 to join ("splice") them together. After the two tape portions have been spliced together, blocks 36 and 37 are again moved away from the front wall 4, back to the original plane, and the winding spindle 25 is operated to wind a predetermined amount of the use tape 7 onto the hub 26 of the cassette 9. When the winding is complete, the blocks 36 and 37 are again simultaneous moved backward towards the front wall 4 to allow the cutter 226 to cut the use tape 7 between the blocks 36 and 37. Block 37 is thereafter moved to bring track 35, having the leader portion 27a therein, into alignment with the use tape 7 in track 34 of block 36 to permit the splicing unit 39 to be operated to splice the two tape pieces together. The winding spindle 25 is then operated to wind the joined use tape 7 and the leader tape 27 into the cassette 9.

The use tape 7, which comes from the pancake 6 mounted on the support hub 3, is first engaged by the loading module 2 with a roller 119. The direction of the tape 7 is changed from substantially horizontal to substantially vertical as it is bent around the roller 119. This positions the tape 7 so that it can properly engage a miniaturized vacuum column—counter wheel combination 113.

The vacuum column 111, which is of substantially reduced size as compared to those columns used on previous tape loading machines, acts as a control device and is used to synchronize the motor associated with the support hub 3 and the motor associated with winding spindle 25. The counter wheel 112 measures the amount of use tape which is fed into each cassette 9 from the pancake 6. The combination of these two elements into a single unit 113 results in a substantial space savings.

When a cassette 9 has been properly loaded it is released from the loading station 8 and is directed to discharge means 40 (FIG. 1) which automatically moves it out and away from the loading module 2.

In greater detail, a cassette 9 is released from the loading station 8 as plate 21 moves backward. The cassette 9 falls downward, under the influence of gravity, toward a deflector plate 43. When the deflector plate 43 is in a first position it directs the cassette 9 to an out-feed chute 41 or out-feed conveyor (not shown) disposed underneath the corresponding loading station 8. The chute 41 terminates at a discharge conveyor 42 at the back of the machine 1. When the deflection plate 43 is in a second operating position, for cassettes that are found to be defective or were not properly loaded, the cassettes 9 are dropped down into a scrap receptacle 44 located under the loading modules 2.

It should be understood that the operations concerning the feeding of individual cassettes 9 to the loading station 8, the loading of the cassettes 9 with the desired amount of use tape 7 and the transferring of the loaded cassettes to the out-feed conveyor 42, have been described above with reference to a single loading module 2. However, those operations take place in an identical manner in all loading modules 2 provided in the cassette loading machine 1.

The loading machine 1, shown herein with the present invention, further comprises a manipulating unit 45 which is operated each time one of the pancakes 6 mounted on one of the support hubs 3 has insufficient use tape 7 left to fully load a cassette. At that time, the manipulating unit 45 automatically replaces the empty pancake with a new pancake 6.

During the normal running of the cassette loading machine 1, the manipulating unit 45 is preferably positioned in front of the storage unit 46 with one of the pancakes 6 filled with use tape 7 engaged on support arm 81.

When a pancake 6, mounted on one of the support hubs 3, is detected to be out of use tape 7 (or has insufficient tape 7 to fill a cassette), the manipulating unit 45 is brought in front of the out of tape loading module 2 by the movement of the main carriage 74. (If there is an insufficient amount of tape 7 remaining on the reel to fill a cassette 9, the windoff/positioning assembly 216 is operated to wind off the remaining tape as scrap.) The empty hub 6a to be replaced is removed from the support hub 3 by the grasping and release member 83 associated with the supply/discharge device 79 or 80 and is expelled onto a receptor arm 164 located near the storage unit 46 as the manipulating unit 45 is brought back toward the storage unit 46.

As shown in FIG. 1, each pancake 6 located in the pancake magazine 46 has a free end 7a oriented outwardly. When the pancake 6 has been mounted on a support hub 3, the corresponding free end 7a is located by a reading member (not shown) and picked up by a grasping member (not shown) thus engaging the free end portion 7a. A setup means (not shown) then threads the use tape 7 between the different components of the corresponding loading module 2.

In greater detail, the use tape 7 first passes before the vacuum column (control unit) 111. In addition, the use tape 7 passes over the counter wheel 112. Finally, the use tape must be placed on the splicing block 37.

Once the free end of tape 102b has been positioned in the predetermined location with the aid of the reading member, the gripping fingers are activated to close and pick up the free end portion 102b.

In order to thread the use tape 7 through the various components of the corresponding module, the gripping fingers are moved downwardly until the a position below vacuum column 111 and counter wheel 112 is reached.

The main carriage 74 is then moved along the guide bars 75 causing a horizontal displacement of the gripping fingers underneath the vacuum column 111, towards the splicing blocks 36 and 37, thereby threading the tape 7 around the counter wheel 112.

During the horizontal movement of the gripping fingers the gripping fingers are slightly raised to enable them to ride over the splicing blocks 36 and 37. When the gripping fingers have moved past the blocks 36 and 37 they are lowered again to lay the tape 7 onto the appropriate grooves of the blocks.

The gripping fingers are opened and the free end of tape 102b is released. (It is held in the grooves of the blocks by vacuum). Then the gripping fingers are brought back to the starting position. Simultaneously, the main carriage 74 moves backward along the guide bars 75 to bring the manipulating unit 45 back in front of the storage unit 46.

The tape 7 is thereafter engaged by winding member 122 associated with the windoff/positioning assembly 216 which is designed to wind off (waste) a predetermined amount of tape 7.

The tape loading module 2 of the present invention achieves reduced size and increased efficiency. The use of the small vacuum chamber 111 combined with the small sized counter wheel 112 into a single unit 113 is just the first part. The extraction of the leader tape from the empty cassettes, before the cassettes reach the loading position results in a substantial time savings. Still further, the location of the extractor pin assembly away from the loading position provides more space for the windoff/positioning assembly 216 to move.

The movement of both blocks 36 and 37 into a first plane for splicing and a second plane for other operations also reduces the space required by the loading module 2. This is because the windoff/positioning assembly can pass over the blocks 36 and 37 to position the tape in the grooves, when the blocks are in their first plane. Then, because both blocks 36 and 37 can shift inwardly to a second plane for cutting and splicing operations, the splicing mechanism 39 can be mounted very close to the blocks without interfering with the movement of the windoff/positioning assembly 216.

Finally, the overall width of the loading module is diminished and the efficiency enhanced by the very short stroke used by the windoff/positioning assembly 216 to position the tape in the grooves of the blocks 36 and 37 during tape loading operations. Traditionally, the stroke of a positioning assembly was significantly longer because of a frequent desire to cut the leader tape in the center. The primary way of achieving this objective was to fully extract the leader tape from the cassette in the loading position and place it in blocks positioned appropriately along the stroke. The present invention can be used to achieve the centering of the cut of the leader tape when it is coupled with an apparatus for locating a predetermined point on a cassette tape. Such a device is described in U.S. Pat. No. 5,125,588, which is incorporated herein by reference. This apparatus can be incorporated into the loading module of the present invention or placed in a remote location. If the centering of the leader tape is not necessary, no such apparatus need be added.

The cassette loading machine described herein has a productivity which is at least comparable to that of four separate prior art loading machines, although the size and bulkiness of the apparatus is considerably less than four typical machines acting independently of one another, in large part because of the reduced size of the tape loading modules 2 of the present invention.

It will be recognized that although four modules of the present invention are used together in one common tape loading machine, any number of loading modules can be used depending upon the level of productivity desired.

Although the present invention has been described with reference to a specific embodiment, neither the specifically described method of operation, nor the specific structure described should be construed as limiting since the disclosed embodiment is merely illustrative of the invention. One of skill in the art may alter the described embodiment without departing from the spirit or scope of the invention.

I claim:

1. A tape loading module comprising:
   an extraction member, wherein said extraction member engages a leader tape in a cassette, extracts a loop of leader tape from the cassette and disengages the loop of leader tape before said cassette reaches a separate loading position;
   cassette support means for releasably supporting a cassette in said loading position, in which position said cassette is to be loaded with use tape;

positioning means for engaging said extracted leader tape when the cassette is in the loading position and, positioning said leader tape on a plurality of splicing blocks;

winding means for winding use tape into a cassette supported by said support means; and splicing means for splicing an end of use tape to the leader tape extracted from each said cassette.

2. An apparatus according to claim 1, wherein said plurality of splicing blocks move between first and second vertical planes.

3. An apparatus according to claim 2, further comprising reduced size control means for controlling the operation of said winding means integral with a counter wheel.

4. A method of loading tape into a cassette comprising:

providing a source of use tape;

threading use tape from said source of use tape between components of a tape loading module into engagement with a tape splicing assembly;

staging a cassette at a first position;

extracting a loop of tape from the cassette in said first position;

moving the cassette from said first position to a second, loading position;

engaging said extracted loop of tape in said loading position and further withdrawing tape from said cassette to place the tape into operating engagement with said tape splicing assembly;

splicing a portion of the tape extracted from the cassette to the use tape;

winding a predetermined amount of use tape into the cassette; and discharging the filled cassette from the loading position toward a collection point.

5. A method according to claim 4, comprising the additional steps of:

placing use tape in a first track in a first splicing block;

placing tape withdrawn from the cassette in the loading position in aligned second and third tracks in said first splicing block and a second splicing block, respectively, wherein said first and second splicing blocks are in a first vertical plane;

shifting said first and second splicing blocks into a second vertical plane;

cutting the tape withdrawn from the cassette into two pieces held respectively in said aligned second and third tracks;

shifting said second block relative to said first block to align said first and third tracks;

splicing the use tape in said first track to the withdrawn tape from the cassette in said third track;

shifting said first and second splicing blocks back into said first vertical plane;

loading use tape into the cassette;

shifting said first and second splicing blocks into said second vertical plane such that use tape is in both said first and third aligned tracks;

cutting the use tape into two pieces held respectively in said first and third aligned tracks;

shifting said second block relative to said first block to align said second and third tracks;

splicing the withdrawn tape from the cassette in said second track to the use tape in said third track; and shifting said first and second splicing blocks back into said first vertical plane.

6. A tape loading module comprising:

staging means for holding cassettes in a staging position;

loop extraction means for extracting a loop of tape from cassettes in said staging position and disengaging from said loop;

means for automatically feeding cassettes from said staging position to said loading position;

means for automatically engaging a loop of tape and withdrawing a relatively small amount of additional tape from cassettes in said loading position, wherein said loop engagement means places said withdrawn tape in operating engagement with means for splicing tape;

means for winding tape into cassettes in said loading position; and means for releasing cassettes from said loading position after a predetermined amount of tape is wound into each cassette by said tape winding means.

7. An apparatus according to claim 6, further comprising reduced size control means for controlling the operation of said winding means integral with a counter wheel.

8. An apparatus according to claim 7, further comprising leader centering means for automatically centering said leader tape before cassettes reach said loading position.

9. An apparatus to claim 6, wherein said loop extraction means comprises a rotatable pick.

* * * * *